United States Patent [19]

Kronogård, deceased et al.

[11] Patent Number: 4,506,509
[45] Date of Patent: Mar. 26, 1985

[54] GAS TURBINE PLANT

[75] Inventors: Sven-Olof Kronogård, deceased, late of Lomma, Sweden; by Allan Lindén, administrator, Gothenburg, Sweden

[73] Assignee: United Turbine AB & Co., KG, Sweden

[21] Appl. No.: 526,329

[22] Filed: Aug. 25, 1983

[30] Foreign Application Priority Data

Sep. 8, 1982 [SE] Sweden ............................... 8205099

[51] Int. Cl.³ ............................................. F01B 21/04
[52] U.S. Cl. ..................................... 60/720; 60/39.31; 74/665 A; 74/665 D
[58] Field of Search ..................... 60/39.15, 39.31, 698, 60/716, 720; 123/DIG. 8; 74/665 A, 665 C, 665 D

[56] References Cited

U.S. PATENT DOCUMENTS

| | | | |
|---|---|---|---|
| 2,242,495 | 5/1941 | Wolf | 60/720 X |
| 2,333,611 | 11/1943 | Wolf | 74/665 D |
| 3,722,214 | 3/1973 | Guillot | 60/39.31 |
| 4,337,623 | 7/1982 | Kronogard | 60/716 |

Primary Examiner—Stephen F. Husar
Attorney, Agent, or Firm—Cantor and Lessler

[57] ABSTRACT

A gas turbine plant including one or more gas turbine units comprises a base member formed like a box having square end walls and four side walls joined thereto. An output shaft is journalled centrally in the end walls and carries a gear wheel, the diameter of which is slightly less than the side dimensions of the end walls. The rotor shaft of the gas turbine is, at least partly, enclosed in a housing component having a base portion adapted to be mounted upon arbitrary side wall of the base member. Two gear wheels are mounted upon a lay shaft in the housing. One of these gear wheels meshes with a gear wheel upon the rotor shaft, while the other gear wheel, when the unit is mounted upon the base member, meshes with the gear wheel enclosed therein.

5 Claims, 10 Drawing Figures

GAS TURBINE PLANT

BACKGROUND OF THE INVENTION

In order to cover the power required within certain fields of use a series of prime mover sizes is usually needed. This means a high cost per unit, and also often an expensive stock-keeping of spare parts. On many occasions a "package" embodiment is further called for, for instance in mobile compressor and electric generator units, where a compact, lightweight prime mover is required. The same applies to an increasing demand for stationary plants.

By using gas turbine units built as modules in a standard size it is possible to cover a wide power demand. In this manner the initial cost per unit will be low, while simultaneously stock-keeping of spare parts can be minimized. A very compact and lightweight plant is obtainable for use for various purposes, such as operating electric generators
heat pumps
compressors
pumps, as well as in
total energy systems.

A rapid supply of electric current in case of breakdown of the power mains is vital for hospitals, shopping centers, big office buildings, but also for isolated built-up areas. A gas turbine does not need any supply of cooling water, which in case of need makes it preferable to the internal combustion engine.

A gas turbine is very silent and can easily, due to its small dimensions, be built into a "package" plant, and can be fully sound insulated.

On many occasions it is important and economically favourable that industrial engines can use various kinds of fuels. A gas turbine can advantageously use gaseous, liquid as well as solid fuels.

By the present invention it is possible to cover wide power requirements by using a common basic unit (a gas turbine), and mounting 1, 2, 3 or 4 such units in a plant. With a basic unit having, say, a normal output of 100 kW it is easy to provide a version of, say, 75 kW output (reduced turbine inlet temperature) or a 150 kW-unit (uprated version with certain components made of ceramic material). The first version can be fully identical with the basic unit, while the second one can be comparable up to 80 or 90%.

With these standard modules it is possible to cover the following power requirements.

75-300 kW in steps of 75 kW
100-400 kW in steps of 100 kW
150-600 kW in steps of 150 kW.

It is of course possible to combine units with varying output rates, and in such manner it will be possible to cover the field 75-600 kW in small steps.

In various versions the gas turbine is built in a non-regenerative and a regenerative embodiment, respectively, to make possible an adjustment towards high power density, or high thermal efficiency, respectively. The power density at a non-regenerative version may be 2 to 3 times as high as with a regenerative version. In certain applications for military purposes, as well as for use on marine oil drilling rigs the power density is a very important parameter. Even a regenerative version is, however rather compact compared with other engines available on the market.

On an oil drilling rig it is, for example, advantageous to be able to operate the power units upon gas or upon crude oil. A gas turbine may use both kinds of fuels in the same combustor if this is dimensioned for dual-fuel operation. Either fuel, or both fuels simultaneously may be used in order to provide a maximum of availability. The turbine is advantageously designed with simple can-type combustor, but on occasions an annular one may be useful.

By substituting the combustor and the fuel system in gas turbines according to the invention, which is easily performed, solid fuels (for instance coal, wood, peat), or slurries (coal/oil, coal/water or coal/oil/water) may be used instead of the gaseous or liquid fuels.

In a basic concept a gas turbine unit may be largely composed of standard components used in the car industry in order to make possible the introduction of large series. It is for instance possible to use rotors and bearings from turbochargers and lamella-clutches from automatic gear boxes.

SUMMARY OF THE INVENTION

The aim of the present invention is to propose a modular system for industrial gas turbines, in which one or more gas turbine units may be mounted upon a compact, box shaped gear housing base member. This is formed as a rigid structure, having reinforced walls which makes it possible to mount the gas turbine units cantileverwise therefrom. The unit(s) may comprise a heat exchanger, which is fitted directly at the unit. The heat exchanger is preferably manufactured from ceramic material, so the influence of increased overhang will be insignificant.

DESCRIPTION OF SOME PREFERRED EMBODIMENTS

Figure 1:
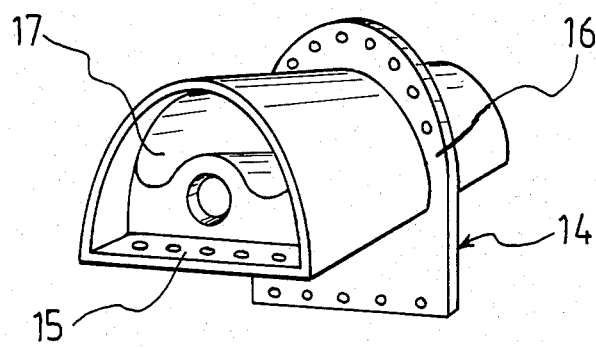
FIG. 1 schematically shows a perspective view of a housing component for a gas turbine unit, FIG. 2 schematically shows a perspective view of a base member for carrying one or more gas turbine units.
Figure 2:
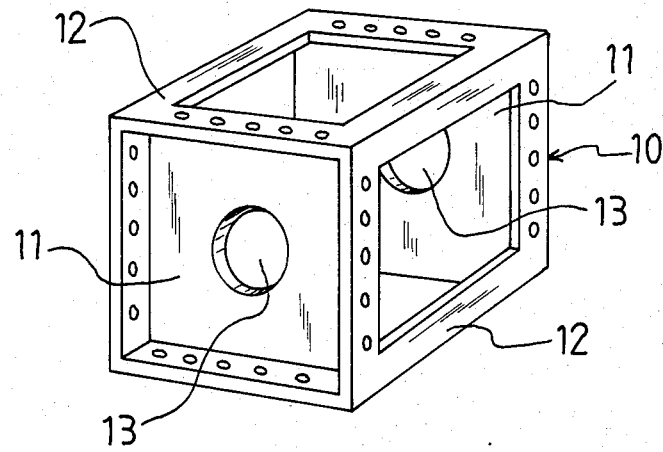

FIGS. 1 and 2 shows very schematically two main components of a power plant according to the invention.

A base member 10—FIG. 2—is formed as a prismatic box having two square end walls 11 and four mutually alike side walls 12 joined thereto. The end walls 11 are provided with central openings 13, in which, in a manner to be described later on, an output shaft will be journalled. Internal ribs and other reinforcing members (not shown for sake of simplicity) will ensure a rigid structure with small elastic deformation where the bearings are fitted. This makes possible the cantileverwise mounting of the gas turbine/heat exchanger configuration which is found desireable.

The side walls 12 have a large opening and are provided with openings for bolts and possible guiding pins arranged in such a manner that a gas turbine unit may be mounted at any of the side walls, or any of the side walls may be attached to a support.

Examples of mounting one or more units are shown in FIGS. 3–6.

FIG. 1 shows the main support, a housing component 14 of a gas turbine unit, suited to be attached to a base 10. The housing component 14 includes a base portion 15 suited to be attached to an arbitrarily chosen side wall 12 of the base member, and has thus about the same dimensions as the latter. The housing component encloses, as will be apparent from the following description, a gearing and bearings for the rotor shaft. The complete gas turbine unit, including possible heat exchanger is supported cantileverwise from the base member, due to the strong structure of the housing component 14. A flange 16 located transversely with respect to the base portion 15 provides a mounting for further components in the compressor/turbine housing, but is not directly attached to the base member 10.

The air intake 17 to the compressor is arranged at a portion of the housing compressor 14 remote from the flange 16, and the in-flowing air will pass along the gearing and the bearing to ensure cooling thereof.

Figure 3:
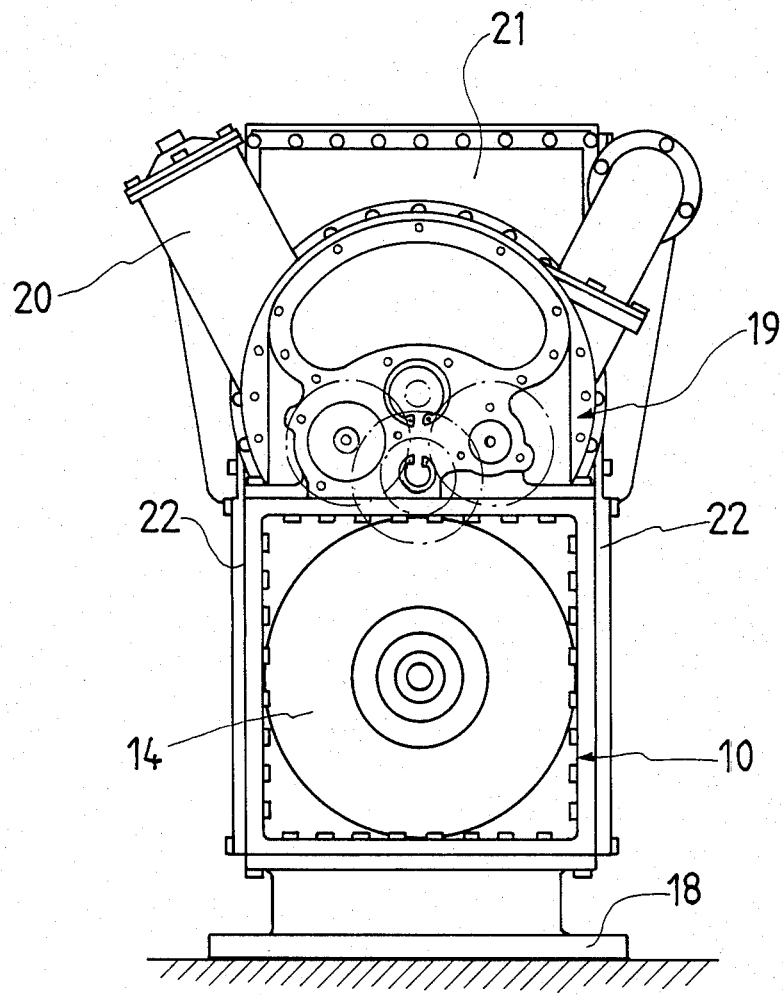
FIG. 3 shows an end view of a power plant comprising a single gas turbine unit mounted upon the base member.

FIG. 3 shows a plant including a single gas turbine unit only. The base member 10 is mounted upon a support 18, and the unit 19 here includes a combustor 20 of the can-type, as well as an air preheater 21.

The two vertical side walls in the base 10 are covered by plates 22.

Figure 4:
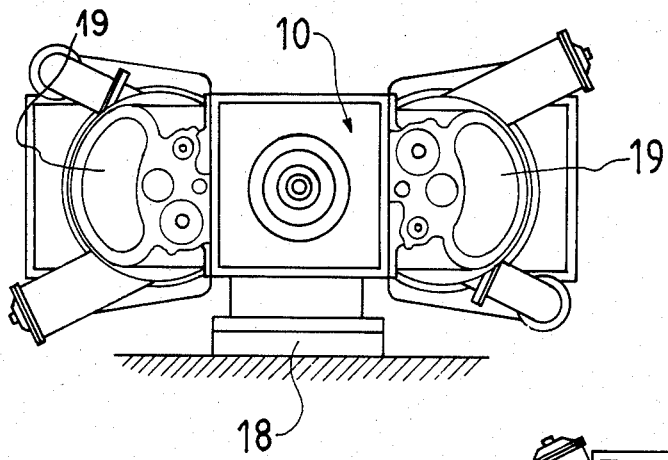
FIGS. 4, 5 and 6 show end views of power plants including two, three and four gas turbine units, respectively.
Figure 5:
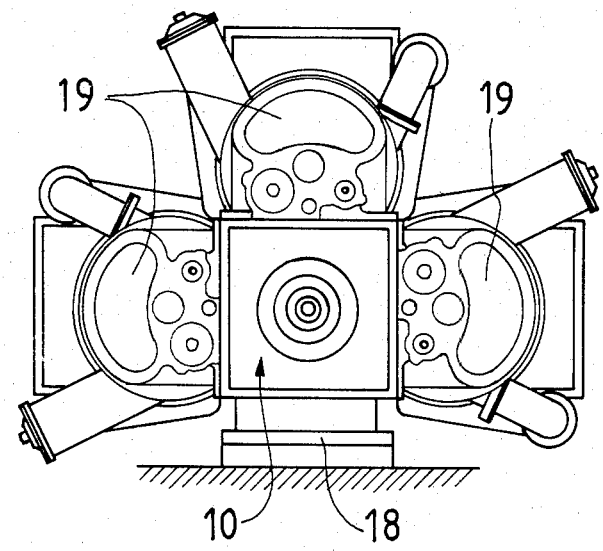

FIG. 4 shows a plant including two gas turbine units 19, and FIG. 5 shows a plant including three units.

Figure 6:
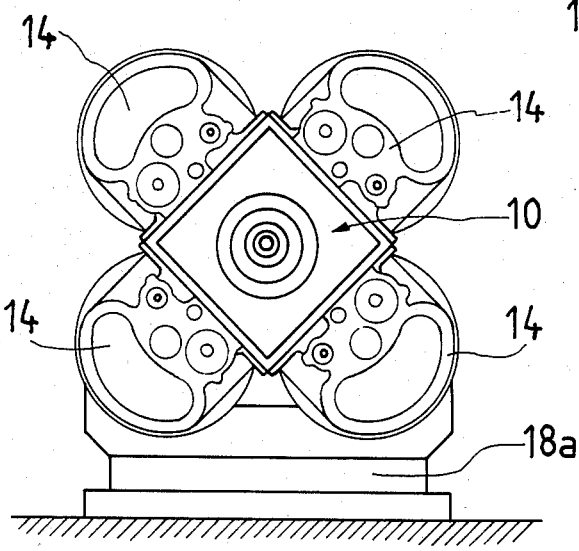

The embodiment according to FIG. 6 includes four gas turbine units and the support 18a is adapted to carry at the two lower units.

For the sake of simplicity the combustors, heat exchangers and connecting pipes are not shown in FIG. 6. Combustors of the can-type permit a simple mounting and survey, but combustors of the annular type will require less space.

Figure 7:
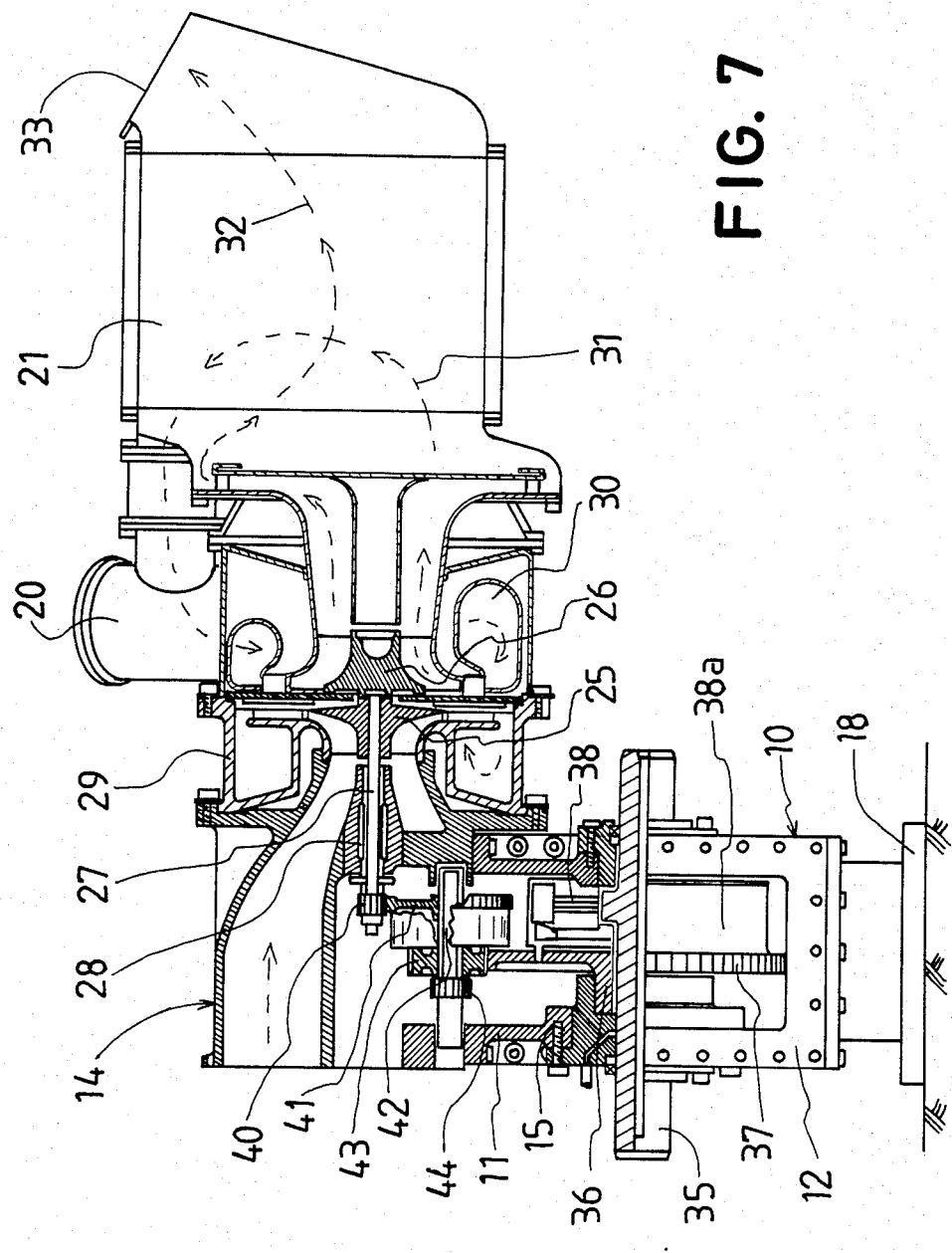
FIG. 7 shows a side view, partly in section, of a base member mounting a single gas turbine unit, FIG. 8, on a larger scale, shows a slightly modified version of the gas turbine unit and its mounting upon the base member, FIG. 9, on a still larger scale, shows a detail of the gear train between the gas turbine and the output shaft.
Figure 8:
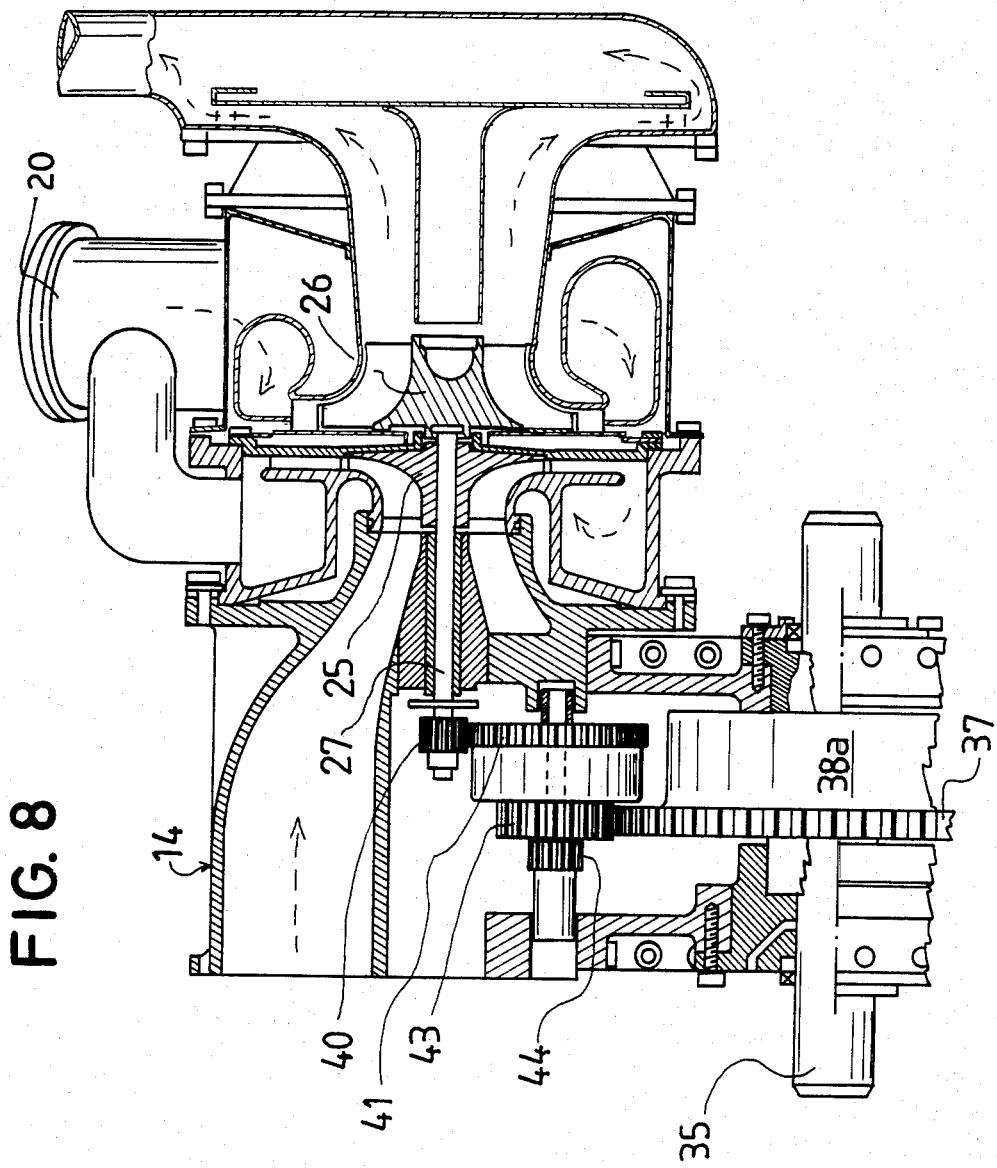
Figure 9:
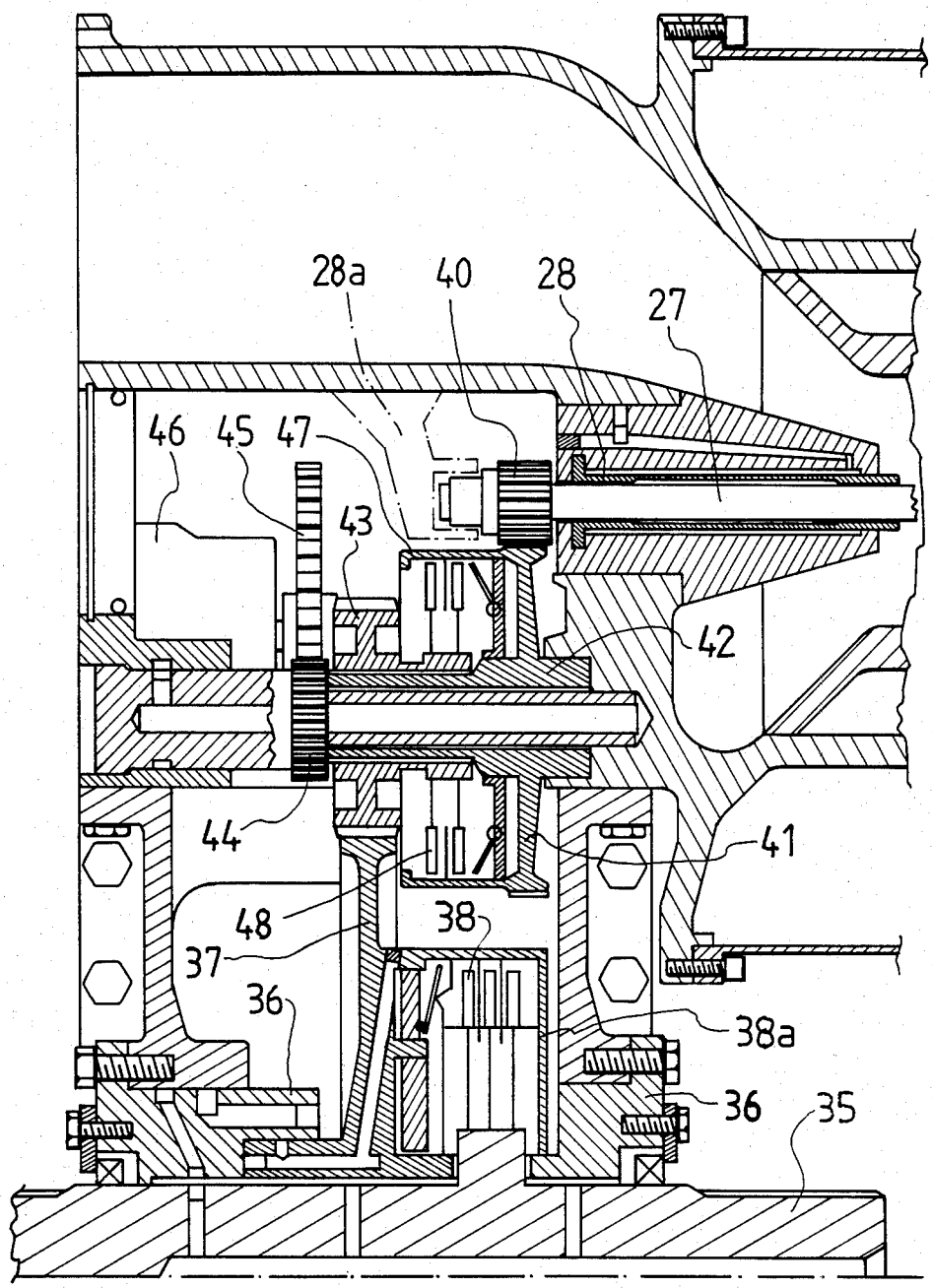

FIGS. 7, 8 and 9 show units 19 mounted upon a base member 10. FIG. 7 shows a total view of the plant. FIG. 8, on a larger scale shows the design of the rotor and the gearing, and FIG. 9 on a still larger scale shows the gearing and the clutch arrangement.

These figures illustrate how the housing component 14 rests upon the base member 10, and that the other components of the unit 19 are carried cantileverwise by the housing component.

A compressor rotor is denoted by 25, and a centripetal turbine rotor is denoted by 26. The rotors are mounted "back-to-back" upon a common shaft 27, which is carried in bearings 28 in the housing component 14. A support bearing 28a may possibly be provided at the outward end of shaft 27, and is in FIG. 9 denoted by broken lines. The compressor housing 29 is mounted upon the flange 16, and carries the turbine housing at its end remote from the flange. The turbine housing includes an inlet volute 30, which communicates with the combustor 20.

The flow paths for air and gas, respectively, are indicated by broken lines 31, 32. The gas outlet 33 from the heat exchanger 21 is located far from the bearings and the gearing.

FIG. 8 shows a modified embodiment, where the compressor air is conducted directly to the combustor.

The high turbine speed at shaft 27 must be reduced to a suitable speed at the output shaft 35, which by means of bearing boxes 36 is carried in the end walls of the base.

As it is desirable to be able to mount a gas turbine unit to any of the side walls of the base member 10, a special lay-out of the gearing is necessary.

The gearing includes a big-diameter, driven gear wheel 37, mounted upon the output shaft 35, and optionally connectable thereto by means of a lamella clutch 38. The housing 38a thereof is integral with the gear wheel 37, the external diameter of which is selected to be somewhat less than the side dimension of the end walls 11. The gear wheel will thus not extend fully to the side walls of the base member.

A first driving wheel 40 is mounted upon the turbine/compressor shaft 27, and meshes with a gear wheel 41 upon a lay shaft 42, journalled in the housing component 14. The lay shaft carries two driving gear wheels 43 and 44, respectively. The latter is intended, by way of an idler wheel 45 (see FIG. 9), to drive one or more auxiliaries 46.

The gear wheel 41 is fixedly mounted upon shaft 42 and carries the housing 47 of a clutch 48, by means of which the gear wheels 43 and 44 may be drivingly engaged with gear wheel 40.

The gear wheels 40, 41 and 43 are selected so a desired speed reduction is obtained, and the drawings show that both gear wheels 41 and 43 partly extend into the base box. The bigger wheel 41 is located outside of the big wheel 37 and the clutch housing 38a, while the smaller gear wheel obtains the desired meshing engagement with the driving gear wheel 37.

Irrespectively of to which side of the base a gas turbine unit is fitted, or of how many units are attached to the base, there will be space available for the marginal portions of gear wheels 41 and 43.

The reduction gearing may comprise more wheels that those shown. Different reduction ratios are obtainable by substitution of the sets of gear wheels.

In a plant comprising more than one gas turbine unit the clutches 48 will provide a possibility to use any desired number of units at a time, and by means of the clutch 38 the plant may be disconnected from a driven machine for adjustment of the same, or of the gas turbine units.

The clutches 38 and 48 are of arbitrary known type. Preferably series-produced lamella clutches used in the car industry are fitted, for instance of truck type with clutch 38 and of passenger car type with clutch 48. Conduits for hydraulic fluid to the clutches and lubricant to the bearings have been indicated in some of the figures, but those systems belong to known technique, and it is not deemed necessary to show them in detail.

The heat exchanger 21 may be of the recuperative or regenerative type and is, as is evident from the drawings, directly connected to and carried by the turbine housing. The heat exchanger is preferably manufactured of ceramic material which permits a compact design with a low weight. This is important as the heat exchanger shall be freely suspended by the turbine and thus lacks direct support from the base.

Figure 10:
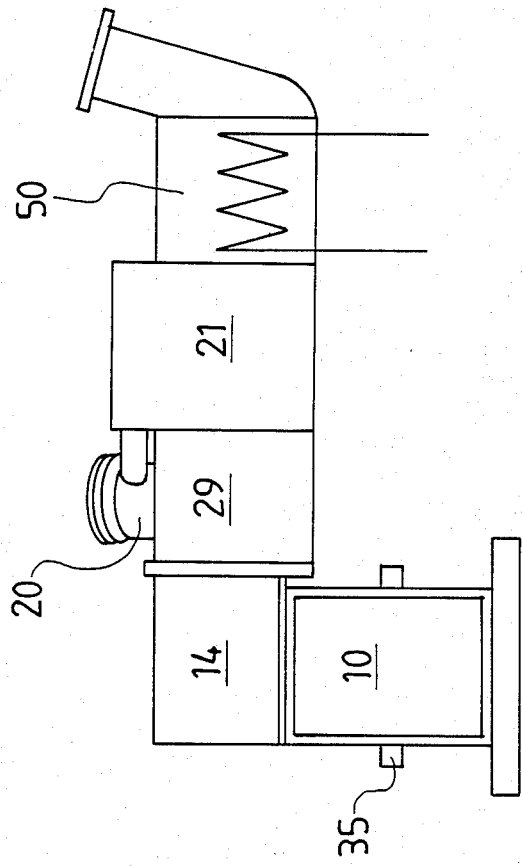
FIG. 10 shows a schematic side view of a "total energy plant" including a gas turbine, a heat exchanger and a water heater.

In a total energy system residual heat in the exhaust gases may recovered in a water heater 50, FIG. 10.

Alternatively it is possible to use the heater 50 in connection with a heat pump.

A total efficiency of 90 to 95% is attainable in a total energy system, where radiation losses and the heat absorbed by the lubricating oil a.s.f. are recovered.

The embodiment above described and shown in the drawings is an example only of the realization of the invention, and the components thereof may be varied in many ways within the scope of the appended claims. The housings for the compressor and the turbine are preferably manufactured of light metal, and they are provided with heat insulation, not shown for the sake of simplicity. The compact design further permits that the whole plant can be enclosed in a sound insulating cover.

For the rotors of the compressor and of the turbine mass produced components for turbochargers to car or truck engines may be used. The compressor rotor is selected from a small turbocharger, whereas the turbine rotor, which shall supply power for driving the compressor as well as supply external power, will have to be selected from a bigger turbocharger.

The air inlet to the compressor is arranged in such a manner that all inlets at a multi-unit plant may be connected to a common air filter, possibly having an inlet sound dampener. The inlets are easily available for cleaning, and may possibly be provided with an automatic cleaning device.

The heat exchanger shown is of a box-like, stationary type, but annular or disc-shaped heat exchangers of stationary or rotating type may be used.

What I claim is:

1. A gas turbine plant comprising:
   a base member formed like a box having two square end walls and four like side walls joined thereto,
   (A) bearing means for carrying an output shaft centrally in said end walls,
   (B) a main gear wheel formed as a clutch and disengageably fitted upon said output shaft, said main gear wheel having a diameter only slightly less than the dimensions of said end walls,
   (C) at least one gas turbine unit for mounting upon said base member with its rotor shaft parallel to said output shaft and including:
      (1) a housing component having a downwardly open base portion defined by a seating mating with either of the side walls of said base member,
      (2) a rotor shaft carrying a compressor rotor and a turbine rotor as well as a driving gear wheel, said rotor shaft being at least partly built into said housing component,
      (3) a lay shaft journalled in said housing component and carrying first and second gear wheels, of which said first wheel is in meshing engagement with said driving gear wheel upon said rotor shaft, and said second gear wheel having a radius making it project with a marginal portion beyond said seating, whereby, when said base portion is mounted upon either of said side walls of said base member it will mesh with the main gear wheel upon said output shaft,
   (D) said base portion carrying said housing component and associated parts cantileverwise from said base member.

2. A gas turbine plant according to claim 1, in which said rotor shaft mounts said compressor and turbine rotors in a "back-to-back" position with said compressor rotor adjacent to said base member, said housing component carrying a bearing for said rotor shaft adjacent to said base member, the inlet to said compressor rotor extending along the adjacent side wall of said base portion, as well as along said rotor shaft bearing.

3. A gas turbine plant according to claim 1, in which said at least one gas turbine unit includes a heat exchanger mounted axially downstream of said rotors, and likewise carried cantileverwise from said base member.

4. A gas turbine plant according to claim 3, further including a water heater mounted cantileverwise downstream of said heat exchanger.

5. A gas turbine plant according to claim 1, in which the diameter of said first wheel is selected so with respect to the bearings carrying said lay shaft, that a marginal portion of said first gear wheel also reaches into the box structure of said base member at a portion remote from said main gear wheel.

* * * * *